Figure 1:
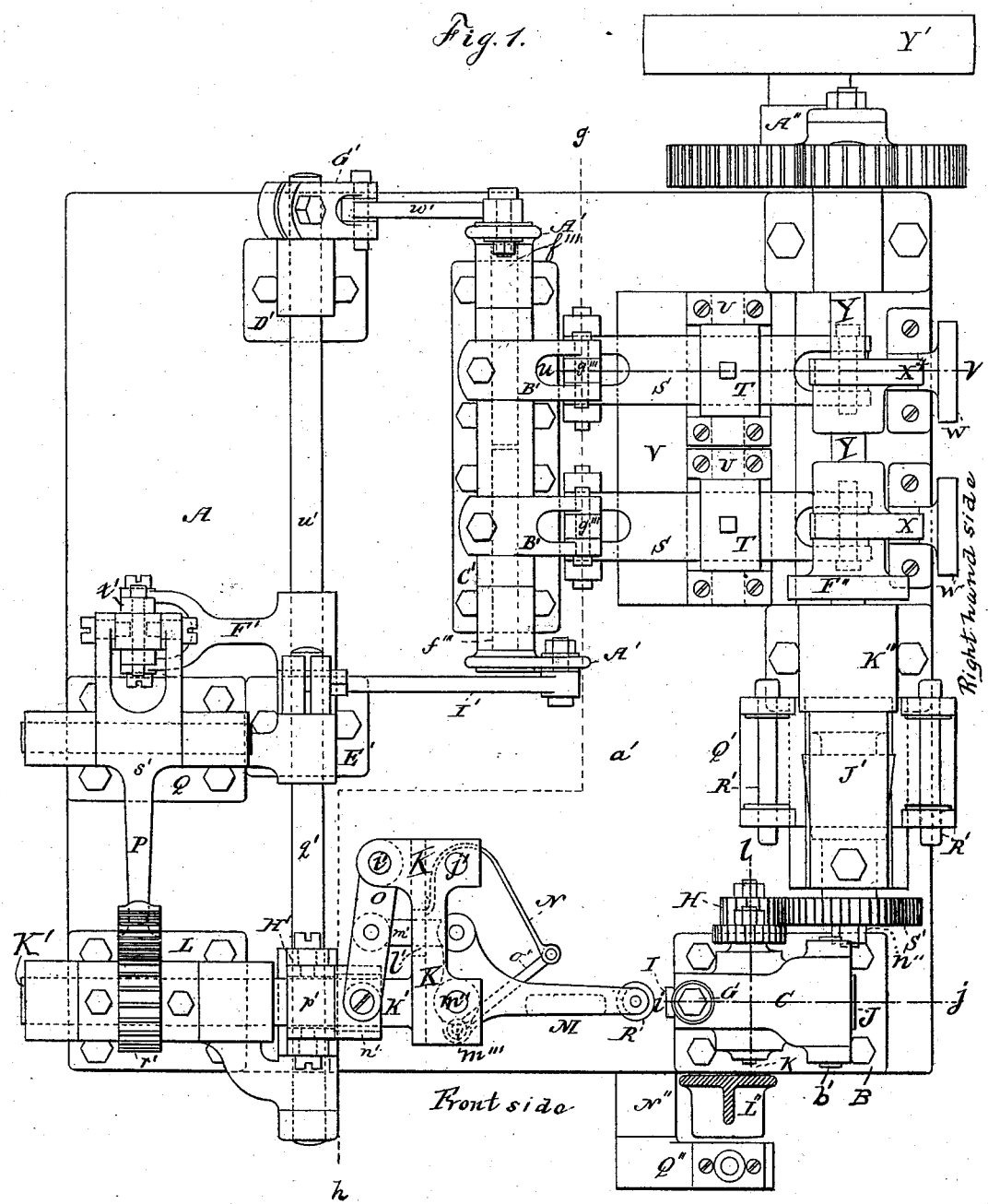

(No Model.)

A. F. FOGELQUIST.
MACHINE FOR BENDING AND CUTTING WIRE.

No. 369,051. Patented Aug. 30, 1887.

10 Sheets—Sheet 1.

Witnesses:
F. Hammatt Norton
Walter N. Crittenden

Inventor:
Adolf F. Fogelquist
by Phillips Abbott
his Attorney

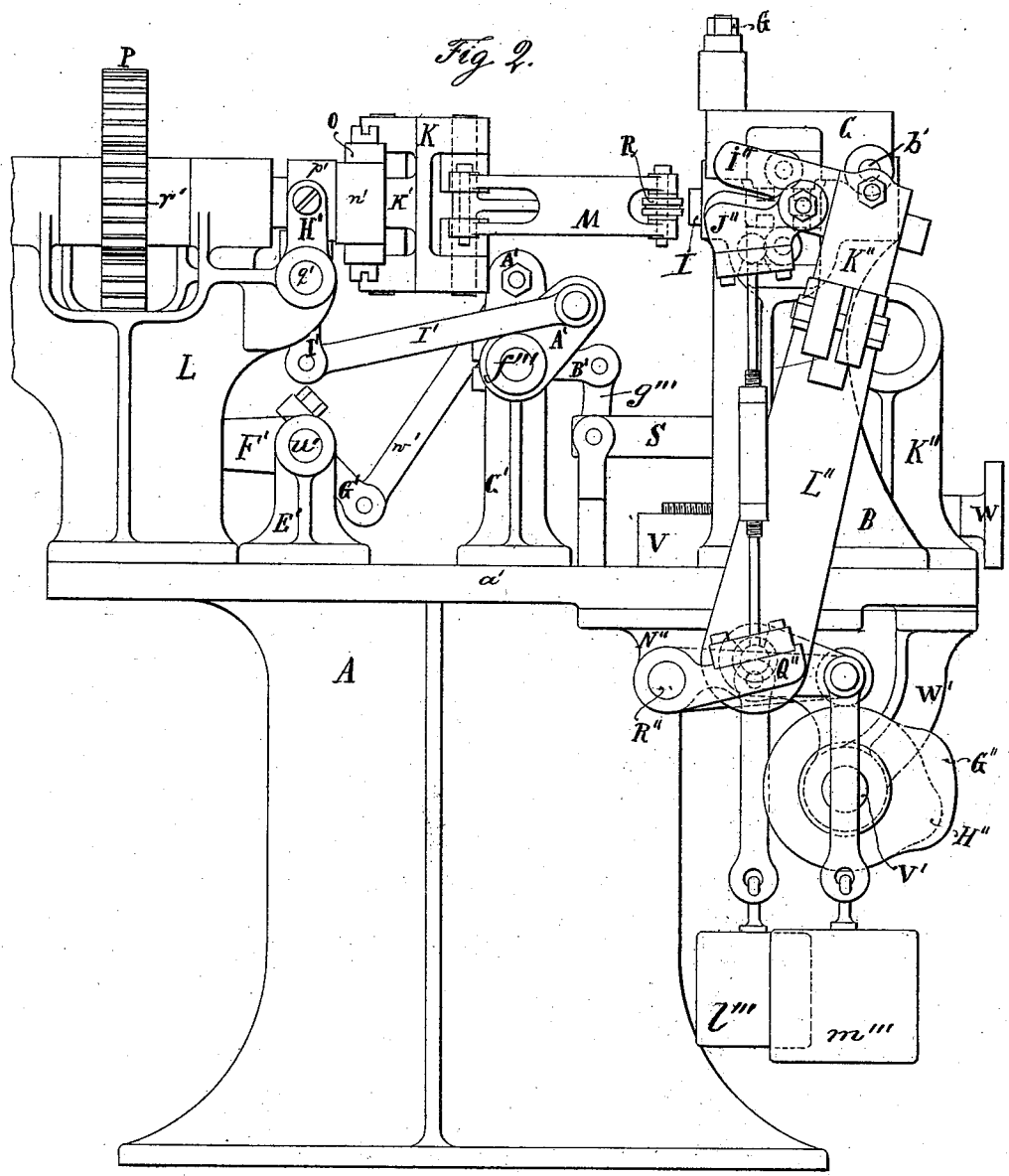

(No Model.) 10 Sheets—Sheet 3.
A. F. FOGELQUIST.
MACHINE FOR BENDING AND CUTTING WIRE.
No. 369,051. Patented Aug. 30, 1887.
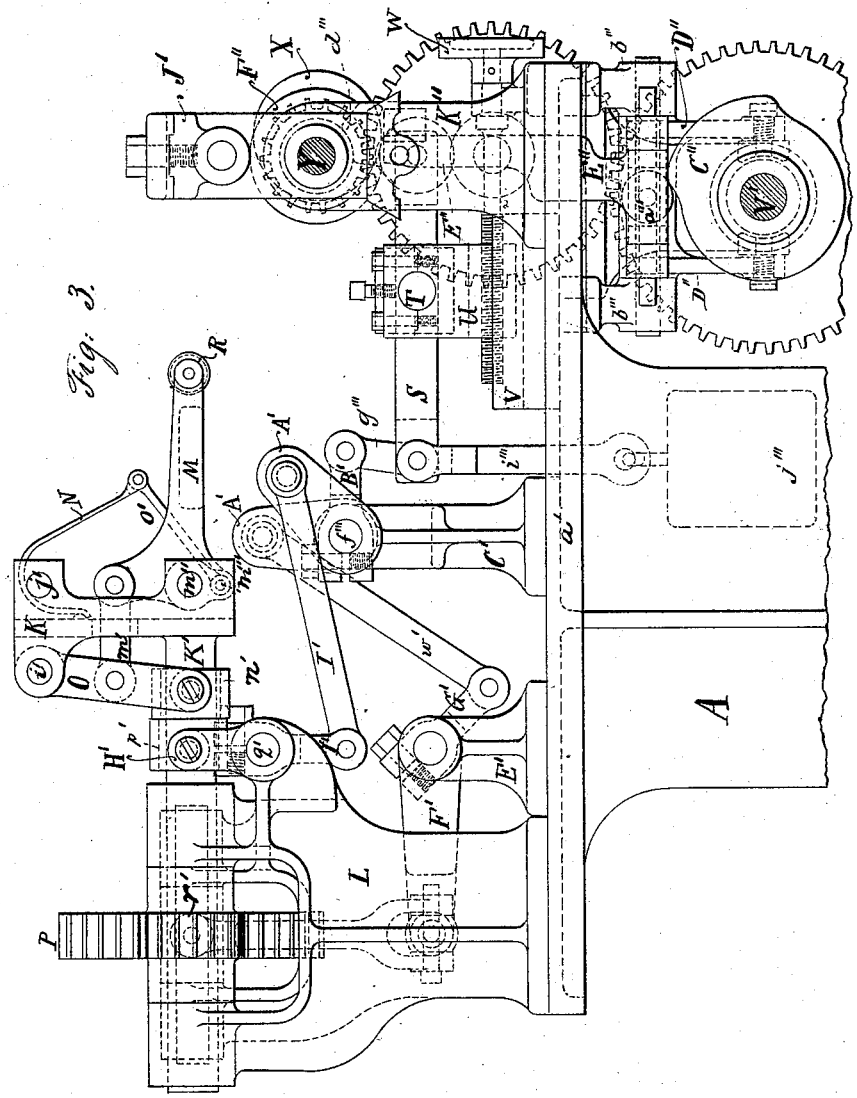
Witnesses:
F. Hammatt Norton
Walter H. Crittenden
Inventor:
Adolf F. Fogelquist
by Phillips Abbott
his Attorney (No Model.) 10 Sheets—Sheet 4.
A. F. FOGELQUIST.
MACHINE FOR BENDING AND CUTTING WIRE.
No. 369,051. Patented Aug. 30, 1887.
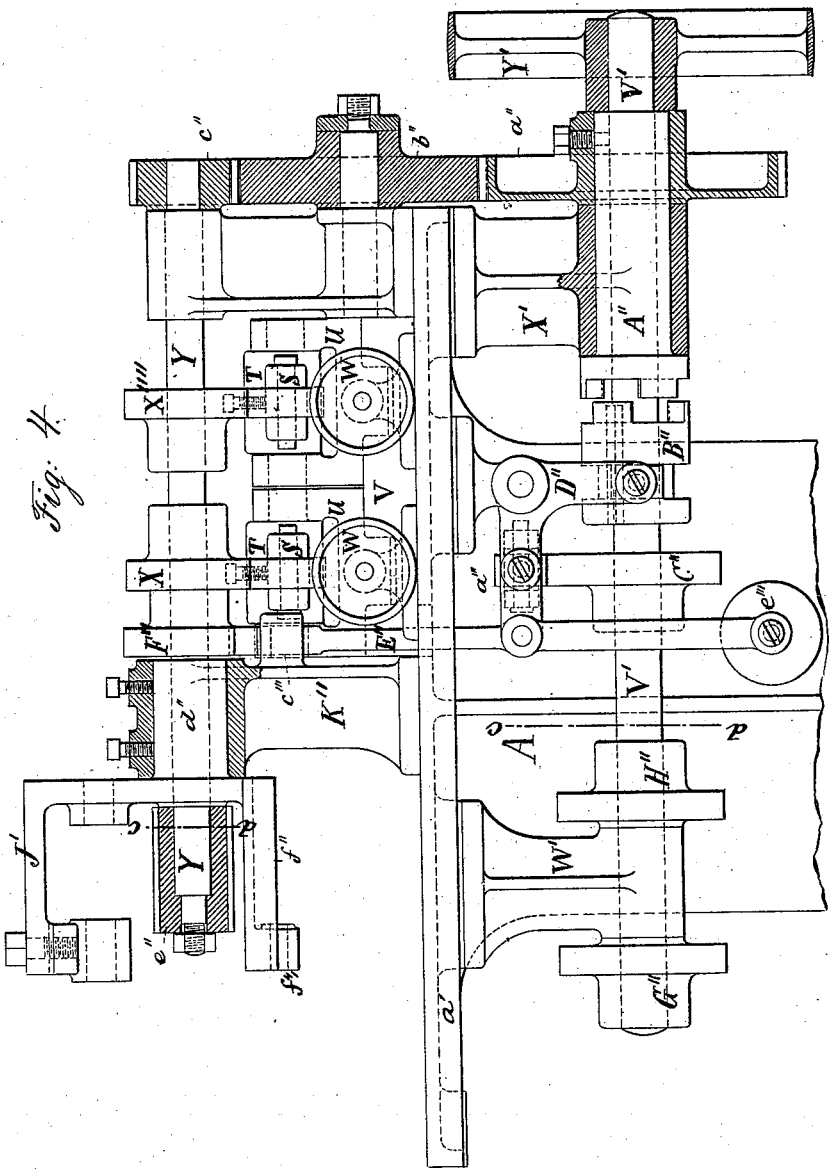

(No Model.) 10 Sheets—Sheet 5.
A. F. FOGELQUIST.
MACHINE FOR BENDING AND CUTTING WIRE.
No. 369,051. Patented Aug. 30, 1887.
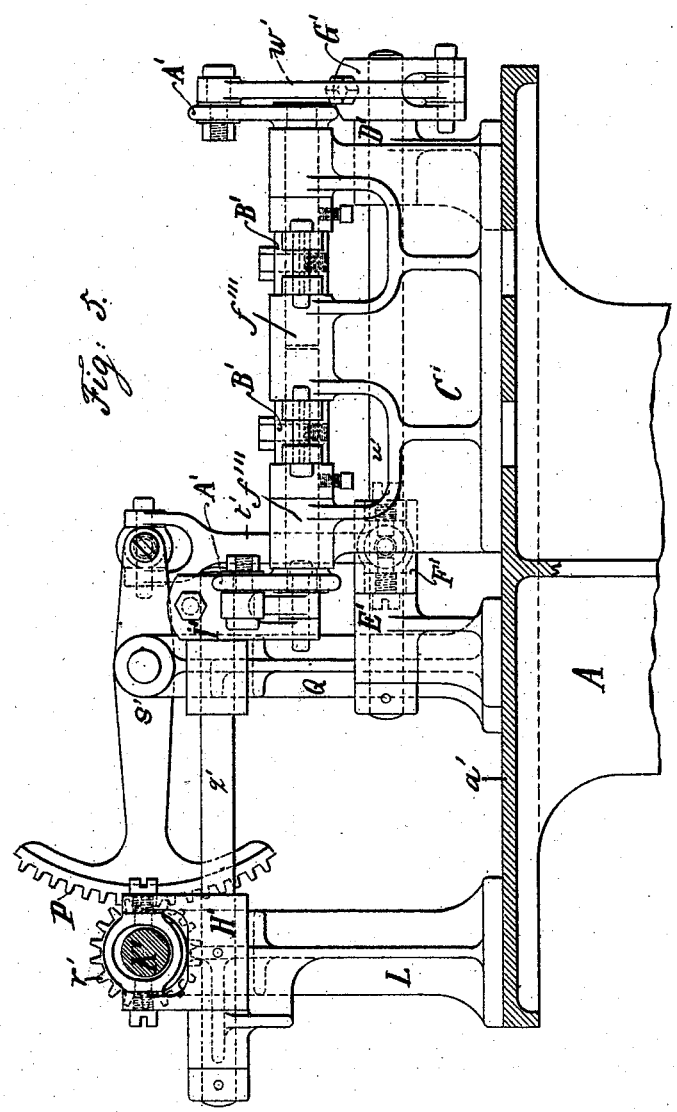

(No Model.) 10 Sheets—Sheet 6.
A. F. FOGELQUIST.
MACHINE FOR BENDING AND CUTTING WIRE.
No. 369,051. Patented Aug. 30, 1887.
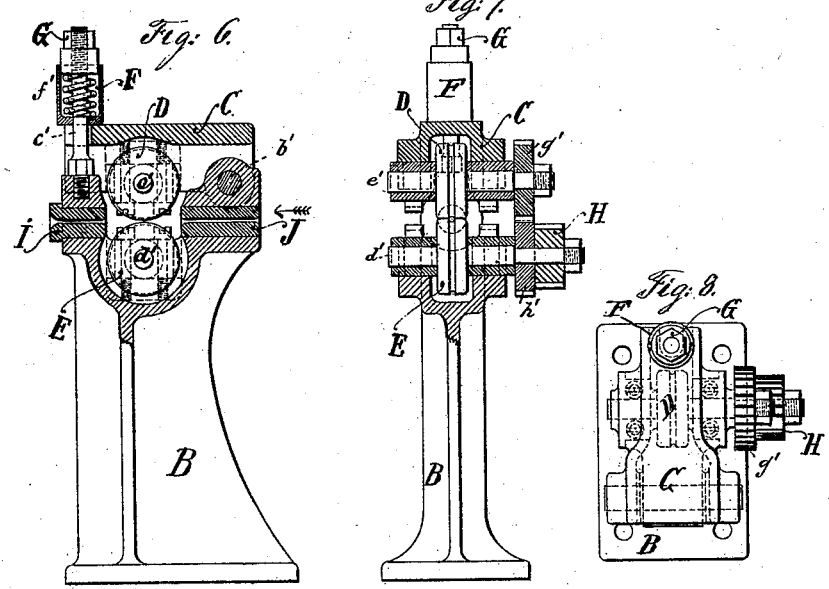

(No Model.)  10 Sheets—Sheet 7.
A. F. FOGELQUIST.
MACHINE FOR BENDING AND CUTTING WIRE.
No. 369,051.  Patented Aug. 30, 1887.

Witnesses:
F. Hammatt Norton
Walter H. Crittenden

Inventor:
Adolf F. Fogelquist
by Phillips Abbott
his Attorney (No Model.) 10 Sheets—Sheet 8.
A. F. FOGELQUIST.
MACHINE FOR BENDING AND CUTTING WIRE.
No. 369,051. Patented Aug. 30, 1887.
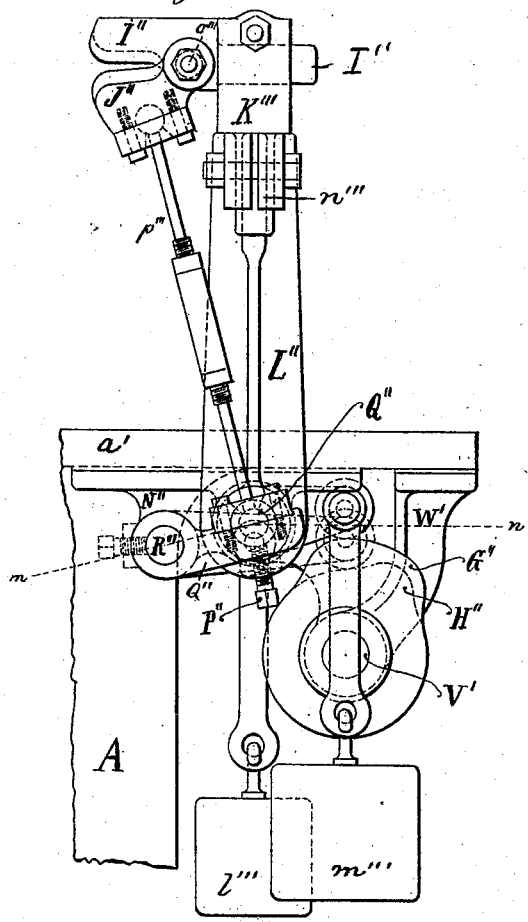
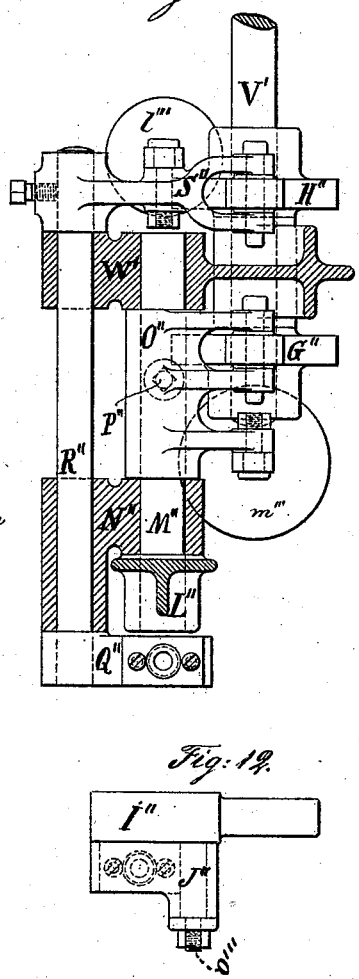
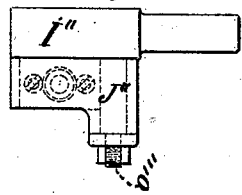
Witnesses:
F. Hammatt Norton
Walter H. Crittenden
Inventor:
Adolf F. Fogelquist
by Phillips Abbott
his Attorney.

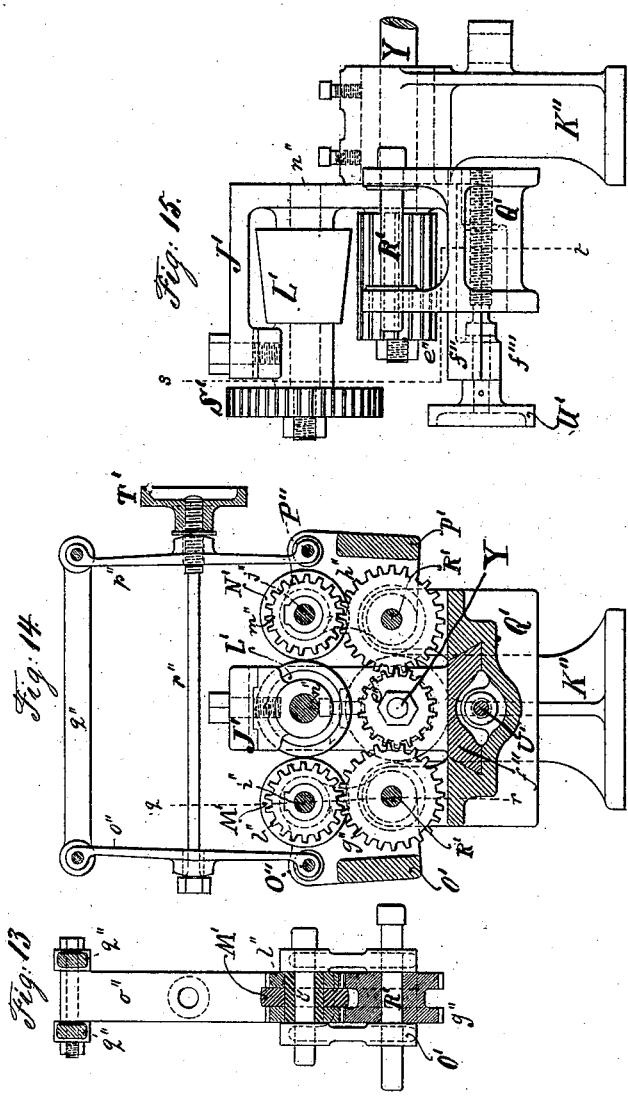

(No Model.) 10 Sheets—Sheet 10.
A. F. FOGELQUIST.
MACHINE FOR BENDING AND CUTTING WIRE.
No. 369,051. Patented Aug. 30, 1887.
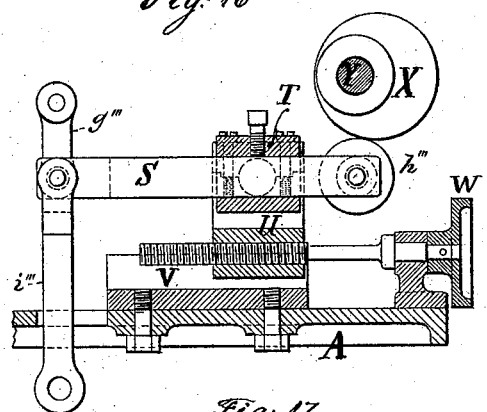
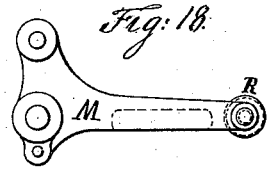
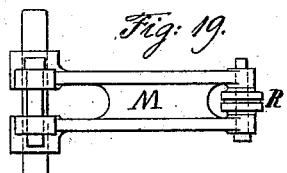
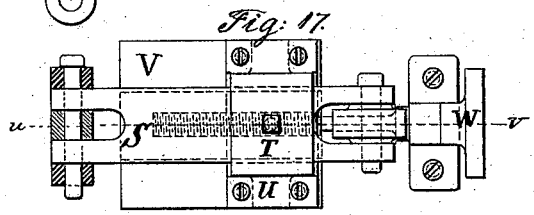
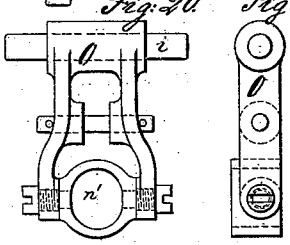
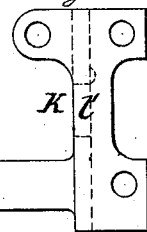
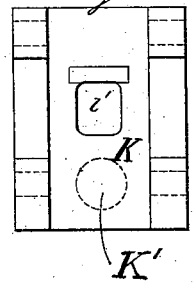
Witnesses:
F. Hammatt Norton
Walter H. Chittenden
Inventor:
Adolf F. Fogelquist
by Phillips Abbott
his Attorney

UNITED STATES PATENT OFFICE.

ADOLF F. FOGELQUIST, OF NEWARK, NEW JERSEY.

MACHINE FOR BENDING AND CUTTING WIRE.

SPECIFICATION forming part of Letters Patent No. 369,051, dated August 30, 1887.

Application filed August 21, 1886. Serial No. 211,477. (No model.)

*To all whom it may concern:*

Be it known that I, ADOLF F. FOGELQUIST, a subject of the King of Sweden, and a resident of Newark, in the county of Essex and State of New Jersey, have invented certain new and useful Improvements in Machines for Bending and Cutting Wire, of which the following is a specification.

The invention relates to machines for bending and cutting wire to be used in the brims of hats, it being also well adapted to the bending and shaping of wires for other uses.

It consists in certain novel elements and combinations of devices, hereinafter described, and particularly pointed out in the claims.

In this specification and the drawings thereof I will more particularly describe and illustrate the machine as adapted to the manufacture of wires for hats, since it is especially intended for that purpose.

The shape of a hat-wire is that of an oval in a curved plane, and this plane is termed in the trade the "set" of the brim. In the machine which is the subject of this application mechanism is provided whereby the length and width of the oval may be regulated at will and any desired set imparted thereto, the whole being under the control of the attendant and adjusted as hereinafter set forth.

Figure 9:
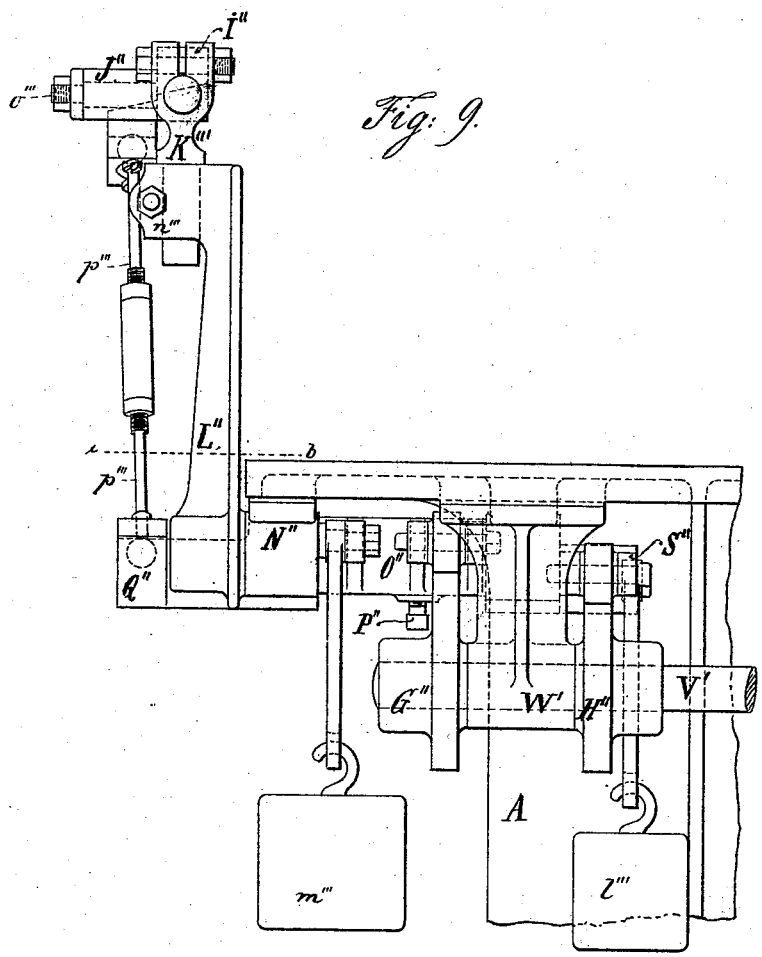

In the accompanying drawings, which illustrate a machine embodying the elements of the invention, Figure 1 is a top view partly in section, the section being on the dotted line *a b* of Fig. 9, whereby the devices for cutting the wire are omitted. From this figure are also omitted, for the sake of clearness of illustration, the gearing shown in Figs. 13 and 14 for regulating the extent of the feed of wire to the machine. Fig. 2 is a front elevation of the machine in completed form. Fig. 3 is a front elevation, that portion of the machine in front of the dotted line *c d* of Fig. 4 being omitted, said portion embracing the devices for feeding the wire and the gearing by which said elements are set in motion, these elements being mounted on frames secured to the bedplate at the right-hand corner of the machine, which bed-plate is consequently not shown in section, the elongated spur-wheel *e''* being also omitted. Fig. 4 is an elevation of the right-hand side of the machine, the wire-feeding devices being omitted and the gearing and drive-wheel being shown in section. Fig. 5 is a vertical section looking toward the left on the dotted line *g h* of Fig. 1. Fig. 6 is a central vertical longitudinal section on the dotted line *i j* of Fig. 1, said figure illustrating the wire-feeding rolls. Fig. 7 is a vertical transverse section on the dotted line *k l* of Fig. 1. Fig. 8 is a top view of the frame inclosing the wire-feeding rollers shown in Figs. 6 and 7. Fig. 9 is a detached elevation, looking at the right-hand side of the machine, of the mechanism for cutting the wire after a sufficient length has been bent into oval form for a hat-brim. Fig. 10 is a detached front elevation of same. Fig. 11 is a horizontal section on the dotted line *m n* of Fig. 10. Fig. 12 is a top view of the cutting-jaws. Figs. 13, 14, and 15 are detached views of certain friction-gearing, hereinafter described, for regulating the extent of the feed of wire through the feed-rollers illustrated in Figs. 6, 7, and 8, Fig. 13 being a vertical section on the line *q r* of Fig. 14; Fig. 14, an elevation, partly in section, on the dotted line *s t* of Fig. 15, and Fig. 15 an elevation looking toward the right-hand side of the machine, the pinions and friction-wheels which impart motion to the cone-shaped roller, occupying the upper central part of said figure, being omitted for the sake of clearness of illustration, said pinions and friction-wheels being shown in elevation in Fig. 14, together with the frame for supporting them. Figs. 16 and 17 are views of mechanism for securing an adjustable balance motion, whereby the movement of the wire-bending devices may be regulated according to the length of the oval and pitch of its curvature desired, Fig. 16 being a vertical section thereof on the dotted line *u v* of Figs. 1 and 17, which latter is a top view. Figs. 18 and 19 are detached views of the tongue for bending the wire, one being a top and the other a side view. Figs. 20 to 23, inclusive, illustrate detached parts of the machine which operate with the wire-bending tongue, and are referred to hereinafter.

In the drawings, A designates a pedestal or base which supports the machine, the pedestal being provided upon its upper surface with the bed-plate *a'*, upon which most of the operative parts of the machine are secured in suitable upright frames or standards. Some of the parts, however, are attached to the under side of the bed-plate and to the frame. Upon the right-hand corner of the front side of the machine is secured the standard B, (see Figs. 1, 2, 6, and 7,) the upper portion of which is hollow, as indicated in Figs. 6 and 7, and is provided with a cap-frame, C, which is pivoted to the standard B at $b'$, and may be swung upward therefrom after loosening the vertical screw $c'$, located at the opposite end of the frame. Within the upper portion of the standard B is journaled the transverse shaft $d'$, upon which is mounted the lower grooved feed-roller, E, and in the cap-frame C is journaled, in suitable blocks, illustrated by dotted lines in Fig. 6, the transverse shaft $e'$, upon which is mounted the grooved feed-roller D. The rollers D E are on the same vertical plane, and are utilized for feeding the wire into the machine and as grippers to hold the wire against revolution on its axis.

The relation of the roller D to the roller E may be regulated, according to the thickness of the wire used, by means of the spring F, encircling the upper portion of the screw-bolt $c'$ and located within the casing $f'$, resting on the cap-frame C. Upon the upper end of the screw-bolt $c'$ is a nut, G, by which the tension of the spring F may be increased or diminished, according to the pressure desired between the feed-rollers.

Within the upper portion of the standard B, and in line with the upper edge of the feed-wheel E, are provided the tubes lettered I J, respectively, the latter being the inlet for the wire and the former the outlet therefor, and being termed the "bending-tube," since it is at the outlet end of this tube that the wire is given form, as hereinafter explained. The transverse shafts $d'$ $e'$ have a simultaneous movement through the medium of the gear-wheels $g'$ $h'$, secured upon them, and these receive motion from the pinion H, secured upon the outer end of the shaft $d'$, and this latter pinion is operated through the gear-wheel S', (shown in Figs. 1 and 15,) in the manner hereinafter set forth.

In line with the bending-tube I is arranged the bending-tongue M, (shown in Fig. 1, 2, 3, 18, and 19,) said tongue being made in the form of a forked bell-crank lever, carrying in the end adjacent to said tube I a grooved roller, R, located in the bifurcated end of the tongue M. The tongue M is pivoted in a frame, K, which is firmly secured upon the end of the shaft K'.

The frame K is illustrated by detached views in Figs. 22 and 23, where it will be seen that it is a casing having lugs on opposite edges adapted to receive and hold pins $i'$, $j'$, and $m'''$, (shown in Fig. 1,) with which certain of the parts engage, as hereinafter stated, and it has also a central transverse aperture, $l'$. The short arm of the lever or tongue M is connected by a link, $m'$, passing through the aperture $l'$, with the lever O, one end of which is journaled on the pin $i'$, while the other is forked and incloses the ring or collar $n'$, arranged over the shaft K'. The tongue M is also pivoted to the casing K at $m''$. The collar $n'$ is given a reciprocating to-and-fro longitudinal movement on the shaft K' at the proper time, as hereinafter specified, and this has the effect of forcing the lever O and link $m'$ toward the wire-feed rollers, and consequently of giving the tongue M a movement on its pivot $m''$ toward the front side of the machine; and in order to retract the said tongue M to its former position a spring, N, is provided, the tension of which acts in a direction opposite to that of the said links.

The spring N is clearly shown in Figs. 1 and 3. One of its ends is secured in the outer end of a link, $o'$, which is attached to the tongue M at $m'''$, as shown, while its other end passes upon the outer side of the pin $j'$ and bears against the inner portion of the frame K.

During the operation of bending the wire into form for a hat-brim the tongue M receives a lateral vibratory movement, and also a rotary reciprocating movement, and this lateral vibratory movement is imparted to it through the medium of the lever O and link $m'$ and the spring N in the manner just described, the lever and link moving the tongue in one direction and the spring retracting it in the opposite direction. The lever O and link $m'$ are actuated by the reciprocating collars $p'$ and $n'$, encircling the shaft K'. The collar $p'$ is secured in the upper forked end of the rocking lever H', mounted on the shaft $q'$, which is journaled in the standards or frames L and Q, as shown in Figs. 2 and 3.

The lever H' receives motion from a downwardly-extending arm, $i'$, attached to the shaft $q'$, and the pitman I', hereinafter described, the movement of the pitman I' acting through the rocking levers H', and lever O and link $m'$, in connection with the spring N, imparting the lateral vibratory movement to the tongue M, above mentioned. The rotary reciprocating movement of the tongue M is secured by means of the pinion $r'$, rigidly secured on the shaft K', into which meshes the toothed segment P upon the front end of the rocking lever $s'$, which is mounted upon an axle in the upper end of the frame Q, as shown in Figs. 1 and 5. In the rear forked end of the lever $s'$ of the segment P is secured the upper end of a link, $t'$, the lower end of which is secured in the forked end of a lever, F', secured upon the rocking shaft $u'$, the latter being mounted in the stands D' and E', as shown in Fig. 1, and receiving motion from the pitman $w'$, as hereinafter described, which is connected with the lever G', clamped at one end on said shaft $u'$.

It will be seen that the bending and forming devices and the mechanisms for operating them are arranged considerably apart from the other parts of the machine, thus rendering access thereto ready and facilitating lubricating and repairs.

I have described above the feeding of the wire into the machine and the movements of the wire-bending tongue, together with the devices more directly connected with the said tongue, and will in the following description explain the gearing by which the feeding of the wire into the machine may be regulated at will, and also the adjustable mechanism by which the shafts $q'$ and $u'$ are actuated to impart the aforesaid lateral vibratory and rotary reciprocating movements to the wire-bending tongue M.

Both the gearing for regulating the feeding of the wire and the adjustable mechanism by which the shafts $q'$ $u'$ are operated receive their movement primarily from the main driving-shaft V', supported below the bed-plate $a'$ in hangers W' and X', as shown in Fig. 4, and adapted to receive motion from the main driving-wheel Y', applied to its outer end.

I will first describe the wire-feeding mechanism. This is shown in Figs. 4, 13, 14, and 15, and is actuated by the horizontal shaft Y, which receives its motion from the main driving-shaft through the gear-wheels $a''$, $b''$, and $c''$, respectively. (Shown in Fig. 4.) The shaft Y is suitably mounted in supporting-standards, its front portion being in the standard K'', wherein upon the shaft is inclosed the sleeve $d''$, forming a part of the frame J'. Upon the front end of the shaft Y, within the frame J', is secured the elongated gear-wheel $e''$, hereinafter mentioned. Upon the lower plate, $f''$, of the frame J' (see Fig. 15) is applied to slide thereon the frame Q', which is connected with the adjusting-screw U', by which it may be moved longitudinally upon the plate $f''$, the latter serving as a guide or base. The front end of the screw U' is suitably collared in a bearing, $f'''$, in the front end of the plate $f''$, as shown in Fig. 15, and is provided with a suitable head, by which it may be turned.

The frame Q' has corresponding sides, one of which is shown in Fig. 15, which support pins R', which are upon opposite sides of the front end of the shaft Y, and upon which are secured the annularly-grooved pinions $g''$ $h''$, respectively, (see Fig. 14,) engaging the elongated pinion $e''$. Upon the pins R' are pivoted also the loosely-mounted side frames (lettered O' P', respectively,) carrying in their upper portion the pins $i''$ $j''$, which are on opposite sides of the cone L, and upon which are mounted the gear-wheels $l''$ $m''$ and friction-wheels M' N', the friction-wheel on each pin being between and having a simultaneous movement with the gear-wheels, which mesh with and receive motion from the gear-wheels $g''$ $h''$, respectively, as best seen in Fig. 13. The peripheries of the friction-wheels M' N' project beyond the edges of the adjoining gear-wheels and impinge upon the surface of the cone L', above mentioned, which is rigid on the shaft $n''$, carrying on its front end the spur-wheel S', hereinbefore described as being in communication with the wire feeding and gripping-rollers D E. The side frames, O' P', have secured upon pins O'' P'' in their upper outer corners (see Fig. 14) the lower ends of the bars $o''$ $p''$, which extend upward, and are connected at their upper ends by the transverse rod $q''$. At about the transverse center of the bars $o''$ $p''$ are apertures, in which is secured by suitable nuts the adjusting threaded rod $r''$, one of said nuts (lettered T') being utilized to draw the bars $o''$ $p''$ in closer relation to each other or to permit the wider separation of the same, whereby the frictional contact of the wheels M' and N' may be regulated. This is secured by means of the rocking of the side frames, O' P', on the pins R' R' consequent on tightening up the adjusting-nut T'. It will be observed that the rotation of the shaft Y and elongated pinion $e''$ is communicated through the gear-wheels $g''$ $h''$ to the gear-wheels $l''$ $m''$ and friction-wheels M' N', and thence through the cone L' to the shaft $n''$ and spur-wheel S', which transmits it to the feed-rolls D E through the pinion H and pinions $g'$ $h'$. The extent of rotation of the cone L for a given period regulates the movement of the feeding and gripping rolls and the length of wire fed into the machine by them, and the speed of rotation of the cone is controlled by the points at which the friction-wheels M' N' come into contact with it. For instance, if the wheels M' N' are in contact with the larger end of the cone, the revolution of the latter will not be so rapid as would be the case if the said wheels were in contact with the smaller end of the cone, and will not consequently cause the feeding into the machine of as great a length of wire.

The position of the friction-wheels M' N' with relation to the points of their contact with the cone L' may be regulated by means of the screw U' and sliding frame Q, which latter supports the gearing, and by moving it the friction-wheels may be moved opposite to any desired point on the cone L'. The purpose of elongating the gear-wheel $e''$ is to permit the longitudinal movement of the gear-wheels $g''$ $h''$ without losing their engagement with it.

It will be necessary when the frame Q' is moved forward in order to bring the friction-wheels M' N' opposite to the smaller end of the cone L' that the screw $r''$ be tightened, so as to draw the bars $o''$ $p''$ closer together and to bring the periphery of said wheels in firm contact with the cone. When it is desired to return the wheels M' N' to a larger part of the cone L', the said bars will be permitted to separate, in order to enable the movement of said wheels to the larger part of the cone without unduly crowding them against the same.

It will be understood from the above description that the length of wire fed through the rolls D E for a single hat-brim may be regulated by the movement of the slide Q'. It will be also readily understood that if a sliding scale of graduations in the length of the shaped wires is not necessary a step-shaped cone provided with different speeds may be used in place of the truly conical friction-roller above described. The feed of the wire through the rolls D E is not continuous. Said rolls have an intermittent motion, each period of operation being equal to two complete revolutions of the shaft Y, this, owing to the adjustment of the machine, being sufficient to feed in enough wire for a single hat-brim.

The motion of the shaft Y and gearing connecting it with the feed-wheels is rendered intermittent by means of the devices described below, viz: Upon the shaft V', above mentioned, adjacent to the drive-wheel Y', is provided a clutch-sleeve, A", (see Fig. 4,) journaled in a hanger, X', said clutch-sleeve being notched on its inner end to engage the adjoining clutch-sleeve B", secured on the shaft V' by a suitable spline. Upon the shaft V', in proper relation to the clutch-sleeve B", is rigidly secured the cam-wheel C", (see Figs. 2, 3, and 4,) having a projection which occupies about one-third of its circumference, and which during the rotation of the wheel comes in contact with the roller $a'''$, (see Figs. 3 and 4,) supported by the upper arm of the bell-crank lever D", the lower arm of which carries blocks fitting into a groove in the clutch-sleeve B" in a customary manner. The crank-lever D" is forked and pivoted between hangers $b'''$, as shown more distinctly in Fig. 3, and its upper arm is pivoted to the vertical bar E", (see Figs. 3 and 4,) which passes upward through the bed-plate $a'$ and a guide, $c'''$, secured to the standard K", the upper end of the bar E" being in suitable position to enter, when elevated by the cam C", the notch $d'''$, formed in the periphery of the collar F", which is rigidly secured on the shaft Y. (See Fig. 3.) The upper arm of the crank-lever D" has a weight, $e'''$, suspended from it, in order to retain the roller $a'''$ in constant contact with the cam-wheel C". The bar E" is arranged to act upon the collar F" only when the clutch-sleeves A" B" are disconnected from each other, and the purpose of the said bar is to stop the rotation of the shaft Y at the proper point, as hereinafter more fully explained.

The gear-wheel $a''$ (see Fig. 4) is connected to and moves with the clutch-sleeve A", and the latter only rotates when the clutch-sleeve B" is in engagement with it, and as the sleeve B" is freed from the sleeve A" during one-third of a revolution of the cam C", it will appear evident that the clutch-sleeve A" only rotates with the shaft V' during two-thirds of each of its revolutions, remaining idle the other third, and that the shaft Y (the gearing $a''$ $b''$ $c''$ being properly timed) will make two revolutions during the two-thirds movement of the clutch-sleeve A", remaining idle during the time the said sleeve is at rest.

During the two revolutions of the shaft Y a sufficient length of wire is fed into the machine for a single hat-brim, as above described, and in order to positively prevent the momentum of the machinery from giving the shaft Y a greater movement than desired I have provided the bar E", which during every two revolutions of the shaft Y enters the notched collar F", and there remains as a stop until the shaft V' has completed its revolution, when the bar E" will be lowered and the shaft Y be permitted to make two more revolutions and cause the feeding into the machine of another length for an additional hat-brim. The stop-bar E" will not be necessary in all cases, only when the momentum of the machine is such as to carry the feeding devices around after the power which drives them has ceased.

I have described the mechanism for feeding the wire into the machine, and, following the plan of the specification above pointed out, I will now explain the adjustable mechanism for actuating the shafts $q'$ and $u'$, by which the tongue M, carrying the bending-roller, is given the lateral vibratory and rotary reciprocating motion. It will be remembered that the shaft $q'$ is actuated from the pitman I', and that the shaft $u'$ receives its motion from the pitman $w'$, as shown in Fig. 1. The pitman I', at its inner end, is secured to the crank-lever A', (see Figs. 1 and 3,) which is attached on the outer end of the rocking shaft $f'''$, journaled in the stand C', and having clamped upon it the lever B', which is connected with the upper end of the link $g'''$, the lower end of said link being connected with the balance-lever S, (see Figs. 1, 3, 16, and 17,) which extends toward the right-hand end of the machine and carries in its end the roller $h'''$. The lever S passes through the sleeve T, journaled in the pillow U, forming a fulcrum for said lever. The sleeve T and pillow U are distinctly shown in an end view in Fig. 4, from which, as well as Fig. 16, it will be seen that the pillow, when moved by the screw W, slides between the guides V. By operating the thumb-screw W the pillow and sleeve T may be adjusted toward or from the adjacent edge of the machine, and the fulcrum of the lever S thereby altered at will, according to circumstances, as hereinafter explained.

From the inner end of the lever S is suspended by a link, $i'''$, the weight $j'''$, (shown by dotted lines on Fig. 3,) the effect of the weight being to insure the contact of the roller $h'''$ in the front end of the lever S with the eccentric X, secured on the shaft Y. (See Fig. 16.) The line of devices between the lever I' and shaft Y, last above described (viz., crank-lever A', rocker-shaft $f'''$, lever B', link $g'''$, balance-lever S, movable fulcrum, and eccentric X) are duplicated, and bear similar letters, between the lever $w'$ and the cam $X^4$ on the said shaft Y, whereby the movement of the shaft may be utilized to operate both the lever I' and lever $w'$. The rotation of the shaft Y causes the cams X $X^4$ to impart a rocking motion to the levers S, which operate through the links $g'''$, shafts $f'''$, levers A', and levers I' $w'$, respectively, to rock the shafts $q'$ and $u'$, and these in turn actuate the wire-bending tongue M, as hereinafter described. Thus it will appear obvious that the eccentric X operates to impart the lateral vibratory motion to the tongue M, while the eccentric $X^4$ serves to produce the rotary motion in said tongue.

The vibratory throw of the bending-tongue and its roller forms the oval in the wire, and this movement may be adjusted at will by altering the position of the fulcrum of the lever S, which is in connection with the lever I', and also by altering the angular positions of the crank-lever A' and the clamp lever and pitman connecting said lever A' with the shaft $q'$, the adjustment of these levers having particular reference to the curvature of the quarters of the oval, said quarter being between the transverse center of the oval and its ends. The set of the wire for the brim is formed by the rotary movement of the tongue M and its bending roller, and this may be regulated by adjusting the fulcrum of the lever F', which is in connection with the lever $w'$, and also by altering the angular positions of the connecting-lever A' and clamp-lever G', the adjustment of these levers governing the particular curvature of the set in the quarters of the oval.

In the foregoing description I have explained all of the machine with the exception of the cutters and their operating mechanism by which the length of wire after being formed into the oval is severed from the main coil of wire being fed to the machine, and these cutters and their mechanism will be now explained, reference being had to Figs. 2, 4, and 9 to 12, inclusive. Upon the front end of the main driving-shaft V' are rigidly secured the cam-wheels G'' H'', having their enlarged portions on different planes, as shown in Fig. 9. The object of the cam G'' is to secure the proper position of the cutter-jaws, which are lettered I'' J'', for severing the wire while the bending mechanism is at rest, and that of the cam H'' is to cause the cutter-jaws to have a shear-like motion.

On the under side of the front right-hand corner of the bed-plate $a'$ is secured a hanger, N'', and in this and the hanger W' is mounted a rock-shaft, R'', (see Fig. 11,) having on the inner end the lever S'', which carries a roller held in contact with the cam H'' by a weight, $l'''$. (See Figs. 10 and 11.) Upon the front or outer end of the rock-shaft R'' is secured the lever Q'', having in its outer end the socket of a ball-and-socket joint, the latter being in line with the rock-shaft M'', also mounted in the hangers N'' and W', as shown in Fig. 11. Upon the center of the shaft M'' is secured by a screw, P'', the lever O'', carrying a roller held in contact with the cam G'' by a weight, $m'''$, and upon the outer end of this shaft is secured the upright arm L'', having at its upper end the split clamp $n'''$, inclosing the stem of a split clamp, K''', which effectually holds the shank of the cutter-jaw I'', as shown in Figs. 9 and 10. Upon the side of the jaw I'' is pivotally secured on a pin, $o'''$, the lower cutter-jaw, J'', which is connected with the lever Q'', above mentioned, by means of the extensible screw-rod $p'''$, having at each end a ball-and-socket joint, as shown. In the operation of the cutting-jaws the cam G'' (through the lever O'', shaft M'', and upright arm L'') swings the jaws inward into proper engagement with the wire, the adjustment being such that the wire will be received between the jaws beyond the bending-wheel R, and then the cam H'' (through the lever S'', shaft R'', lever Q'', and rod $p'''$) moves the jaw J'' upward, thereby severing the wire, after which the cam G'' permits the arm L'' to swing to its former position, thereby removing the cutting-jaws from interfering with the bending of the succeeding hat-wire.

While the cutting-jaws are in use the feeding of the wire into the machine and the movement of the bending-tongue cease, this condition being effected by reason of the fact that the cam-wheel G is timed with the cam G'' H'' to withdraw the clutch-sleeve B'' from the clutch-sleeve A'' during the time that the said cams G'' H'' are operating the cutters. It will be remembered that when the sleeve B'' engages the sleeve A'' the gear-wheels $a''$ $b''$ $c''$ and shaft Y are in motion, and when the said sleeves are disengaged the driving-shaft turns in the sleeve A'' without rotating it. When the shaft Y is at rest, the cams X X$^4$ cease to actuate the devices which communicate motion to the wire-bending tongue.

It will be noticed that owing to the double adjustment of the cutting-jaws—to wit, a substantially vertical adjustment of the stem of the split clamp K''', and also a substantially horizontal adjustment of the stem of the upper jaw, I'', in connection with the ball-and-socket joints at the ends of the adjustable rod $p'''$—I am enable to so adjust the cutting-jaws and the said rod that I can sever the wire at right angles, irrespective of the position of the wire relative to the swinging arm L''. This is a new and beneficial arrangement of these parts, resulting in several advantages—among them that the wire cuts better at right angles, the cutters have greater durability, and slight adjustment of the length of the wires can be supplied through the swinging of the jaws. There are other advantages also, which need not be recited here.

It is obvious to those skilled in this art that there may be many mechanically equivalent devices used in place of those described and illustrated by me. For instance, springs may be used instead of weights, eccentrics instead of cams, crank-actions instead of geared connections, belting instead of gearing, and in some instances the location and arrangement of the parts may be considerably changed and the plane of movement of the several parts may also in many instances be altered, and still my invention will be employed. I do not, therefore, limit myself to the details of construction shown.

Moreover, I wish it to be understood that the feeding and gripping rollers may be made perfectly flat on their faces instead of having the grooves for the reception of the wire, as shown on the drawings, and, in fact, for ordinary work it is better to have these rollers with flat faces, because considerable care is necessary in making the grooves, and in the exactness of their registration one with the other to avoid twisting of the wire by the impact of the sides of the grooves against it. I have shown the grooves, since in some cases they will be desirable.

I am aware that it is old in machines for coiling wire for woven-wire mattresses and like purposes to employ but a single pair of feeding and gripping rollers, and to arrange the coiling mechanism in proximity to said rollers, a fixed guide or support between the rollers and the coiling mechanism being employed; but in machines for bending wires for hat-brims and similar purposes, in which the wire is shaped into substantially an oval form, it is necessary that the two ends of the wire as it leaves the machine should be in proximity to each other and also lie in the same plane, else when they are united the bent wire will be warped out of its desired shape, and I believe that I am the first, in a machine of this character, to have insured with greater certainty than has heretofore been possible that the ends of the bent wire shall lie in proper juxtaposition, and this I accomplish by arranging the wire bending and shaping devices near to a single pair of rollers, which are the only ones employed both to feed and guide the wire. Incident to this arrangement is the fact that in my machine the wire is free on both sides of the rollers, so that should an irregular portion thereof pass between the rollers it will adjust itself without having imparted thereto a twist, bend, or spring, as is found to be the case when the wire is tightly drawn and held under tension between the feeding-rollers and the bending devices.

I claim—

1. In a wire-bending machine, the combination of feeding-rollers, a stationary standard in which one of said rollers is journaled, a pivoted frame in which the other roller is mounted, whereby one roller may be swung away from the other for the introduction of wire between them, means for fastening the pivoted frame after the wire is introduced, stationary wire supporting and guiding devices arranged on each side of said rollers, and wire-bending devices placed in the path of the wire, substantially as set forth.

2. In a wire-bending machine, the combination of feeding-rollers, a stationary standard in which one of said rollers is journaled, a pivoted frame in which the other roller is mounted, the tubes J I, carried by the standard and arranged to support and guide the wire as it passes to and leaves the rollers, and wire-bending devices placed in the path of the wire after it has left the rollers, substantially as set forth.

3. In a wire-binding machine, the combination of feeding-rollers, a stationary standard in which one of said rollers is journaled, a pivoted frame in which the other roller is journaled, a fastening device engaging with said standard to hold the pivoted frame and its roller in proper relation to the other roller, a spring interposed between said fastening device and the pivoted frame, and wire-bending devices, substantially as set forth.

4. The cutting device herein described and shown, consisting of a swinging arm having shearing-jaws on its free end capable of horizontal and vertical adjustment, an adjustable rod having ball-and-socket connections and arranged to operate the cutting-jaws, and mechanism to automatically swing the said arm and cutters into position and to actuate the shearing-jaws when in position, whereby the cutters may be adjusted to cut the wire at right angles irrespective of the position of the wires relative to the swinging arm, substantially as and for the purposes set forth.

5. A swinging arm bearing the cutters on its free end and a jaw-actuating rod which engages with its adjacent parts by universal joints, whereby the rod will operate the shears irrespective of the position of the shear-bearing arm, substantially as set forth.

6. A bending-tube, I, and a bending-roller, R, arranged to form the bending-points, in combination with a tongue-holder, K, tongue M, spring N, and lever O, which is pivotally connected to a sliding shipper which moves freely over the stem of the tongue-holder, and a connecting-link between lever O and the tongue, substantially as shown and described.

7. The shaft Y and tongue-holder K, connected by adjustable power-conveying mechanism adapted to oscillate the tongue, in combination with the lever H', engaging with a slide which moves freely over the stem of the tongue-holder, and mechanism connecting the slide with a pivoted tongue, M, bearing a wire-deflecting device and mechanism for operating said lever H', substantially as shown and described, 8. In a machine for bending wire for hat-brims and similar purposes, the combination of a pair of rollers, which are the feeding and also the gripping devices, a support for the wire between the feeding and gripping rollers and the bending devices, and a wire deflecting and bending device or devices placed in the normal path of the wire and arranged to be oscillated relative to the same, whereby the wire will be bent into a substantially oval form with its ends in proximity to each other and in substantially the same plane, and mechanism for actuating the said devices, substantially as and for the purposes set forth.

9. In a machine for bending wire for hat-brims and similar purposes, the combination of a pair of rollers, which are the feeding and also the gripping devices, a support for the wire between the said rollers and the bending devices, and wire deflecting and bending device or devices placed in the normal path of the wire and arranged to be oscillated around the wire, whereby it will be bent into a substantially oval form lying in different planes, with its ends in proximity to each other and in substantially the same plane, and also arranged to have a reciprocating movement across the path of the wire, and mechanism for actuating the said several devices, substantially as and for the purposes set forth.

10. In a machine for bending wire for hat-brims and similar purposes, the combination of a pair of rollers, which are the feeding and also the gripping devices, a fixed support for the wire placed between the feeding devices and the wire-deflecting device, said support sustaining the wire in all directions against the stress of the bending device, and a wire deflecting and bending device consisting of a single roller placed in the normal path of the wire and arranged to have a reciprocating movement across the path of the wire and an oscillating movement around the wire, whereby it will be bent into a substantially oval form lying in different planes, with its ends in proximity to each other and in substantially the same plane, substantially as and for the purposes set forth.

11. In a machine for bending wire, the combination, with the wire-bending mechanism and the feeding-rollers, of driving shaft Y, a gear-wheel, $e''$, mounted thereon, another shaft, $n''$, from which the feeding-rollers are driven, a conical gear-wheel, $L'$, on shaft $n''$, a gear-wheel, $h''$, engaging with wheel $e''$, a gear-wheel interposed between wheels $h''$ and $e''$, and a sliding and swinging frame in which the last said interposed gear-wheel is mounted, whereby it may be kept in contact with both wheels $h''$ and $e''$ whatever its place of engagement with the latter, substantially as set forth.

12. In a machine for bending wire, the combination, with the wire-bending mechanism and the feeding-rollers, of a driving-shaft, Y, a gear-wheel, $e''$, mounted thereon, another shaft, $n''$, from which the feeding-rollers are driven, a conical gear-wheel, $L'$, on shaft $n''$, gear-wheels $g''$ $h''$, engaging with opposite sides of wheel $e''$, gear-wheels engaging with wheels $g''$ $h''$ and bearing on opposite sides of wheel $L'$, swinging frames in which the last said wheels are mounted, a longitudinally-sliding frame carrying said swinging frames, and means for adjusting said swinging frames to bring the wheels which they carry into contact with wheel $L'$ whatever the position of the sliding frame, substantially as set forth.

13. In a machine for bending wire, the combination of the wire bending mechanism, the feeding-rollers, gearing $S'$, which drives said rollers, a conical or stepped pulley, shaft Y, gearing interposed between shaft Y and the conical pulley, and adjusting devices for shifting the last said gearing into contact with different portions of the conical pulley in order to change the speed at which the feeding-rollers shall revolve, substantially as set forth.

14. In a machine for bending and shaping wire for hat-brims and similar purposes, the combination of a pair of rollers, which are both the feeding and gripping devices, said rollers being pressed together by elastic pressure, a stationary wire-supporting device to maintain the wire against the stress of the bending device, and a wire bending and shaping device placed in front of the feeding and gripping device and in the normal path of the wire and arranged to oscillate about the path of the wire and also to move laterally to and fro across said path, whereby the wire will be bent into substantially oval form, with its ends in proximity to each other and in substantially the same plane, and means for simultaneously actuating said devices, whereby the bending and shaping device will act on the wire in different planes and to different degrees in different places, substantially as and for the purposes set forth.

15. In a wire bending and forming machine, the combination, with the feeding-rollers and the mechanism for driving the same, of a movable arm having its end in proximity to said feeding-rollers and carrying at said end a bending-wheel which is fixed relatively to said arm, mechanism which oscillates said arm and wheel, connected with the end of the arm opposite the wheel, and mechanism for moving laterally said arm and wheel, also connected with the end of the arm opposite the wheel, said mechanisms operating separately and being arranged, substantially as set forth, away from the feeding devices, thus facilitating access to parts, substantially as set forth.

16. In a wire-bending machine, the combination of a rotatory frame, a lever mounted therein carrying the bending-wheel, devices, substantially such as described, having a longitudinal movement relatively to said frame and connected with said lever, and arranged as they move to rock the lever on its fulcrum to give a horizontal as well as a circular movement to the bending-wheel, substantially as set forth.

17. In a wire-bending machine, the combination of the arm carrying the bending-wheel, shaft $K'$, in which the arm is mounted, pinion $r'$ thereon, rocking lever $s'$, carrying a cogged segment which oscillates pinion $r$, rock-shaft $u'$, and intermediate devices which move said lever $s'$, a collar, $n'$, on the shaft $k'$, connected with the arm carrying the bending-wheel and giving a lateral movement thereto, a rocking lever which intermittingly moves said collar, and rock-shaft $q'$, which operates said lever, substantially as set forth.

18. The combination, in a wire bending and shaping machine, of a single wire-deflecting wheel fixed in the end of a movable lever-arm, said arm having a lateral movement across the normal path of the wire and also an oscillating movement around its axis, whereby the same movements are conveyed to the wire-deflecting wheel, and adjustable mechanism whereby the extent of both the lateral and the oscillatory movement may be regulated at pleasure, a single pair of feeding and gripping rollers, and a fixed support for the wire against the stress of the bending-wheel, substantially as set forth.

19. In a friction-gear, the friction-wheel $L'$ and the friction-wheels M' and N', (both being driving-wheels,) in combination with the spur-wheels $e''$, $g''$, and $h''$, imparting rotation from the shaft Y to the wheels M' and N', and the frames J' Q', and rocking frames O' and P', bars $p''$ and O'', rod $q''$, and screw-rod $r''$, substantially as shown and described.

20. The combination, with mechanism for operating the bending devices, of a clutch-sleeve, A'', a clutch-sleeve, B'', a cam-wheel, C'', a lever, D'', a stopping-bar, E'', and a notched collar, F''', arranged to stop the bending mechanism when the cutting mechanism is operating, substantially as shown and described.

21. A pair of cutters attached to a swinging arm adapted to swing forward with the jaws open, a rocking shaft, M'', in the same center line as the ball-joint in the pivoted lever Q'', the pivoted lever Q'', the rod $p'''$, the cam-wheels G'' and H'', shaped and timed as set forth, and weights or springs to return the parts to their normal position after the cutting has been performed, substantially as shown and described.

22. In a machine for bending wire for hat-brims and similar purposes, the combination of a continuously-rotating shaft, V', a shaft, Y, connected therewith by gearing, the wire-feeding devices driven from shaft Y, the wire-bending devices intermittingly driven from shaft Y, a clutch mechanism between shafts V' and Y, whereby they are automatically disengaged after the wire is shaped, an automatic stop operated by shaft V', which positively prevents further rotation of shaft Y the instant it is disengaged from shaft V', wire-cutting devices operated by shaft V', and devices which automatically move the cutting devices out of the way of the bending devices when they are in operation, and which throw them into the path of the wire after the shaft Y has been stopped, substantially as set forth.

23. A cutting device the jaws whereof are adjustable substantially horizontally and vertically in the end of a swinging bar which supports them, and mechanism to swing the same into engagement with the wire to be cut, and mechanism to operate the same when in position, substantially as and for the purposes set forth.

24. In a cutting device for a wire bending machine, the combination of a pivoted lever, L'', carrying the cutting-jaws, mechanism for rocking said lever to bring the cutters into engagement with the wire, a lever, Q'', a rod connecting lever Q'' with the swing-jaw of the cutters, the connection of this rod with lever Q'' being in line with the fulcrum of lever L'', and means for rocking lever Q'' after the cutters have been brought into engagement with the wire, substantially as set forth.

25. In a cutting device for a wire-bending machine, the combination of a pivoted lever, L'', the cutting-jaws carried thereby, having both a vertical and a horizontal adjustment, lever Q'', an extensible rod connecting lever Q'' with the movable cutting-jaw, and mechanism for moving said levers L'' and Q'', substantially as set forth.

26. In a cutting device for wire-bending machines, the combination of a supporting-arm, the clamp K''', adjustable therein, and the cutters adjustable in clamp K''' on a line substantially at right angles to the adjustment of clamp K''', substantially as set forth.

Signed at New York, in the county of New York and State of New York, this 16th day of August, A. D. 1886.

ADOLF F. FOGELQUIST.

Witnesses:
F. HAMMATT NORTON,
JOHN H. IVES.